3,562,310
NOVEL POLYSULFATES AND METHODS
FOR THEIR PREPARATION
Louis G. Anello, Basking Ridge, and Richard F. Sweeney, Randolph Township, Morris County, N.J., assignors to Allied Chemical Corporation, New York, N.Y., a corporation of New York
No Drawing. Filed Aug. 11, 1967, Ser. No. 659,867
Int. Cl. C07c 141/02, 141/06
U.S. Cl. 260—457
10 Claims

ABSTRACT OF THE DISCLOSURE

Polysulfate compounds of the formula:

$$[R(CH_2)_m]_2(OSO_2)_pO$$

wherein R is
(a) a haloalkyl group having from 1 to 20 carbon atoms in which the terminal carbon atom is substituted with members selected from the group consisting of fluorine, chlorine, bromine and hydrogen atoms and each carbon atom other than the terminal carbon atom, when present, is substituted with halogen atoms selected from the group consisting of fluorine and chlorine, or
(b) a perhalocycloalkyl group having from 3 to 6 carbon atoms in which each halogen atom is a member selected from the group consisting of fluorine and chlorine,
with the proviso that at least one fluorine atom is attached to each carbon atom in the haloalkyl or perhalocycloalkyl group; $m$ is an integer of from 1 to 3 and $p$ is an integer of from 2 to 6, are prepared by reacting a fluoroalkyl or fluorocycloalkyl iodide corresponding to the general formula:

$$R(CH_2)_mI$$

wherein R and $m$ have the afore-stated meanings, with sulfur trioxide in at least about the stoichiometric proportions for the reaction.

The novel polysulfates may be readily hydrolyzed to the corresponding alcohols using a dilute mineral acid. Corresponding monosulfates known to the prior art may not be hydrolyzed to the corresponding alcohols in this manner but require the use of highly corrosive concentrated mineral acids or the use of alkaline conditions to carry out the hydrolysis.

The novel polysulfates may also be directly converted to the corresponding fluoroalkyl or fluorocycloalkyl acrylate or methacrylate compounds by contacting the polysulfates with acrylic or methacrylic acid at temperatures from about 80 C. to about the boiling point of the reaction mixture for a period of about 1–24 hours. The corresponding monosulfates may not be similarly directly esterified to the acrylate or methacrylate compounds.

BACKGROUND AND DESCRIPTION OF THE INVENTION

This invention is directed to a new class of polysulfate compounds and to novel methods for their preparation. More particularly, this invention relates to certain fluorodialkyl or fluorodicycloalkyl polysulfate compounds and to processes for their preparation using a reagent consisting essentially of sulfur trioxide.

The reaction of sulfur trioxide with certain fluorinated alkanes has been reported in the literature to yield the corresponding fluoroalkanoyl halides which upon hydrolysis are converted to the corresponding carboxylic acid anhydride or free acid. There are obtained as by-product from this reaction certain complex sulfur containing fluorinated oxy compounds which by hydrolysis are converted to corresponding fluoroalkanoic acids and anhydrides.

The reaction of 1,1,2,2-tetrahydroperfluoroalkyl or 1,1,2,2-tetrahydroperfluorocycloalkyl iodides with oleum (sulfuric acid containing an excess of sulfur trioxide) has also been reported to yield the corresponding 1,1,2,2-tetrahydroperfluoroalkyl or 1,1,2,2-tetrahydroperfluorocycloalkyl hydrogen sulfate which may be hydrolyzed with an aqueous mineral acid to the corresponding alcohol. These alcohols are well-known compounds and are useful as intermediates in the preparation of various valuable compounds including acrylic or methacrylic esters, the polymers of which are useful as oil and water repellents. A second product of this reaction is a monosulfate of the formula $(R_fCH_2CH_2O)_2SO_2$ wherein $R_f$ is a perfluoroalkyl or perfluorocycloalkyl group; this monosulfate may be hydrolyzed to the desired alcohol by employment of much more strenuous acidic conditions than is required for the hydrogen sulfate or by use of alkaline conditions after the monosulfate is isolated from the alcohol, produced previously in the acid hydrolysis reaction.

It has been unexpectedly found that novel fluorodialkyl and fluorodicycloalkyl polysulfate compounds having at least one methylene group interposed between each fluoroalkyl or fluorocycloalkyl group and the polysulfate group may be readily formed by reacting the corresponding fluoroalkyl or fluorocycloalkyl iodide or fluorodialkyl or fluorodicycloalkyl monosulfate with a reagent consisting essentially of sulfur trioxide. These fluorodialkyl and fluorodicycloalkyl polysulfates may be directly converted to the known acrylic or methacrylic ester derivatives thereof without the necessity of forming the corresponding hydrogen sulfate and alcohol intermediates. Polymers of the acrylic and methacrylic ester derivatives thereof are known to be useful as oil and water repellent agents. The polysulfate compounds of the present invention possess unexpected increased activity as compared with the corresponding monosulfate compounds since they may be readily hydrolyzed to the corresponding alcohol using a dilute mineral acid, thereby obviating the use of highly corrosive concentrated mineral acids or the necessity to first isolate the monosulfate and then use alkaline conditions to carry out the hydrolysis.

Accordingly, it is a principal object of the present invention to provide novel polysulfate compounds.

It is a further object of the present invention to provide novel methods for the preparation of certain polysulfate compounds using a reagent consisting essentially of sulfur trioxide.

It is another object of the invention to provide a novel method for producing useful alcohol, acrylates and polyacrylates from the novel polysulfate compounds of the invention.

Other objects and advantages will become apparent from the following description.

The polysulfate compounds of the present invention conform to the general formula:

$$[R(CH_2)_m]_2(OSO_2)_pO \qquad (I)$$

wherein R is
(a) a haloalkyl group having from 1 to 20 carbon atoms in which the terminal carbon atom is substituted with members selected from the group consisting of fluorine, chlorine, bromine and hydrogen atoms and each carbon atom other than the terminal carbon atom, when present, is substituted with halogen atoms selected from the group consisting of fluorine and chlorine, or
(b) a perhalocycloalkyl group having from 3 to 6 carbon atoms in which each halogen atom is a member selected from the group consisting of fluorine and chlorine,
with the proviso that at least one fluorine atom is attached to each carbon atom in the haloalkyl or perhalocycloalkyl group; $m$ is an integer of from 1 to 3 and $p$ is an integer of from 2 to 6. Compounds wherein R is a straight-chain perfluoroalkyl group containing from 6 to 14 carbon atoms, $m$ is 2 and $p$ is 2 or 3 constitute preferred embodiments of the present invention.

As used in the present specification, the prefix "perfluoro" means that the compound or group so described contains solely carbon and fluorine.

The fluoroalkyl or fluorocycloalkyl iodide reactants employed in preparation of the novel polysulfate compounds of the present invention correspond to the formula:

$$R(CH_2)_mI \qquad (II)$$

wherein R and $m$ have the afore-stated meaning. Specific classes of iodide reactants employable herein may be represented by the following formulas:

(1) $\qquad Z(CFX)_n(CH_2)_mI$ (2) $\qquad CFXZ[CFXCF(CFX_2)]_s(CH_2)_mI$ (3) 

In the above formulas, Z is a member selected from the group consisting of fluorine, chlorine, bromine and hydrogen; X is a halogen atom having an atomic number not exceeding about 35.5; $n$ is an integer of from 1 to 20; $s$ is an integer of from 1 to 6; $u$ is an integer of from 2 to 4; and $m$ has the afore-stated meaning.

The fluoroalkyl and fluorocycloalkyl iodides having a single methylene group interposed between the fluoroalkyl or fluorocycloalkyl group and the iodine atom, i.e. the 1,1-dihydrofluoroalkyl and 1,1-dihydrofluorocycloalkyl iodides, may be prepared from the corresponding fluoroalkyl or fluorocycloalkyl alcohols having the formula $RCH_2OH$ wherein R has the afore-stated meaning by forming the corresponding p-toluene sulfonyl esters thereof and heating the same at elevated temperatures in the presence of an alkali metal iodide, such as sodium iodide, as is more fully disclosed by Tiers et al. in Journal of the American Chemical Society, vol. 75, pp. 5978–9 (1953).

The fluoroalkyl and fluorocycloalkyl iodides having two methylene groups interposed between the fluoroalkyl or fluorocycloalkyl groups and the iodine atom, i.e. the 1,1,2,2-tetrahydrofluoroalkyl and 1,1,2,2-tetrahydrofluorocycloalkyl iodides, may be prepared by the thermal or photo-chemical addition of ethylene to the corresponding perhalofluoroalkyl and perhalofluorocycloalkyl iodides RI wherein R has the afore-stated meaning as is disclosed by Haszeldine in Journal of the Chemical Society, pp. 2856 (1949); 2789 (1950).

The fluoroalkyl and fluorocycloalkyl iodides having three methylene groups interposed between the fluoroalkyl or fluorocycloalkyl groups and the iodine atom, i.e. the 1,1,2,2,3,3-hexahydrofluoroalkyl and 1,1,2,2,3,3-hexahydrofluorocycloalkyl iodides, may be prepared from the corresponding fluoroalkyl and fluorocycloalkyl alcohols having the formula $RCH_2CH_2CH_2OH$ wherein R has the afore-stated meaning by the method employed in forming the 1,1-dihydro derivatives, described in the next above paragraph. The alcohols $RCH_2CH_2CH_2OH$ may be prepared from the corresponding perhalofluoroalkyl and perhalofluorocycloalkyl iodides RI by reaction thereof with allyl alcohol in the presence of a free radical catalyst such as benzoyl peroxide whereby an intermediate of the formula $RCH_2CHICH_2OH$ is formed and subsequently reducing said intermediate with zinc as is more fully described in U.S.P. 3,145,222.

The fluorodialkyl or fluorodicycloalkyl monosulfate reactant employed in preparation of the polysulfate compounds of the present invention conforms to the formula:

$$[R(CH_2)_mO]_2SO_2 \qquad (III)$$

wherein R and $m$ have the afore-stated meaning. Specific classes of monosulfate reactants employable herein may be represented by the following formulas:

(4) $\qquad [Z(CFX)_n(CH_2)_mO]_2SO_2$ (5) $\qquad (CFXZ[CFXCF(CFX_2)]_s(CH_2)_mO)_2SO_2$ (6) 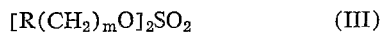

wherein Z, X, $m$, $n$, $s$, and $u$ are as previously defined.

The above depicted fluorodialkyl and fluorodicycloalkyl monosulfate reactants may be prepared by reaction of the corresponding iodides, above exemplified, with oleum at a temperature sufficient to maintain at least one of the reactants in the liquid phase as is more particularly described in British patent specification 994,607. Alternatively, the monosulfate reactants may be obtained by contacting the above-described iodides with about an equimolar amount of sulfur trioxide at reaction conditions, more particularly defined hereinbelow, employed in preparing the polysulfate compounds of the present invention. The reaction which takes place may be represented by the equation:

(A) $\quad 2R(CH_2)_mI + 2SO_3 \rightarrow [R(CH_2)_mO]_2SO_2 + SO_2 + I_2$

The process of the present invention is effected by reacting an iodide or monosulfate having the formulas hereinabove defined with a reagent consisting essentially of sulfur trioxide. Although the sulfur trioxide may be in liquid, solid or gaseous form, it is generally preferred to employ the liquid form, particularly in its stabilized form, i.e. liquid sulfur trioxide containing an additive which inhibits spontaneous isomerization thereof into a form of sulfur trioxide which is solid at room temperature. Technical grade, stabilized, liquid sulfur trioxide, commercially available under the trade name of Sulfan, is particularly suited for use in the processes of the present invention.

In producing the polysulfate compounds of the present invention it is essential that at least a stoichiometric amount of sulfur trioxide required for reaction with the iodide or monosulfate reactant be employed. It should be appreciated that the amount of sulfur trioxide required will depend upon whether the iodide or monosulfate serves as a reactant as well as upon the polysulfate product desired. When a fluoroalkyl or fluorocycloalkyl iodide is employed as starting material, at least 1.5 moles of sulfur trioxide per mole of iodide reactant must be employed in order to produce a polysulfate product conforming to structural Formula I, above defined. For example, when a pyrosulfate is the desired product, i.e. a polysulfate compound conforming to Formula I wherein $p$ is 2, the reaction which takes place may be represented by the following equation:

(B)

$2R(CH_2)_mI + 3SO_3 \rightarrow [R(CH_2)_m]_2(OSO_2)_2O + SO_2 + I_2$

It is evident from the above equation that for each mole of desired polysulfate product produced, two moles of the iodide conforming to structural Formula II, above defined, must be reacted with at least 3 moles of sulfur trioxide. Accordingly, for each additional sulfate ($OSO_2$) unit desired in the polysulfate product, at least one additional mole of sulfur trioxide must be charged for reaction with the iodide starting material. When a fluoroalkyl or fluorocycloalkyl monosulfate is employed as reactant, at least one mole of sulfur trioxide per mole of monosulfate must be charged to yield a polysulfate product conforming to structural Formula I, above defined. For example, the reaction which takes place when a pyrosulfate is the desired product and a monosulfate serves as starting material may be represented by the following equation:

(C) $\quad [R(CH_2)_mO]_2SO_2 + SO_3 \rightarrow [R(CH_2)_m]_2(OSO_2)_2O$

It is evident from the above equation that for each mole of desired polysulfate product produced, one mole of monosulfate reactant conforming to structural Formula III, above defined, must be reacted with at least one mole of sulfur trioxide. Accordingly, for each additional sulfate ($OSO_2$) unit desired in the polysulfate product, at least one additional mole of sulfur trioxide must be charged for reaction with the monosulfate starting material. In general, however, it is preferred to charge an amount of sulfur trioxide in excess of the stoichiometric amount required for reaction with the iodide or monosulfate reactant, for example, about 2 to 10 moles of sulfur trioxide per mole of iodide or monosulfate reactant. Although higher proportions of the sulfur trioxide reactant may be employed, no additional advantages are realized thereby.

The reaction temperature is not critical and may vary from about 0° to 200° C. at atmospheric pressure. The reaction is exothermic and cooling of the reaction vessel contents by any conventional manner is normally required. Accordingly, lower temperatures, for example in the range of about 15° to 70° C., are preferred in order to avoid undesirable side reactions. If desired, particularly at the higher temperatures, the reaction may be carried out at superatmospheric pressures in the range of about 1 to 300 atmospheres, although pressures in the range of about 1 to 20 atmospheres are preferred when superatmospheric pressures are employed. Subatmospheric pressures are also operable. Generally, the autogenous pressure of the reactants at the above temperatures are advantageously employed. For best results, it is preferred to operate at such temperatures and pressures that at least a portion of the iodide or monosulfate reactants are maintained in the liquid phase.

The time required for the reaction is dependent upon such factors as the reactivity of the reactants employed, reaction temperatures, reaction pressures, etc. and may vary from about 10 minutes to 100 hours, although reaction times of 30 minutes to 15 hours are generally preferred.

If desired, the reaction may be conducted in the presence of a solvent. The solvent employable herein should be capable of solubilizing the reactants and products of the reaction and must be inert to the reactants and products of the reaction. Suitable solvents include halogenated hydrocarbons such as hexachloroethane and 1,1,1,3,4,4,4-hexafluoro-2,2,3-trichlorobutane, sulfur dioxide, and the like.

The reaction product, obtained as a result of the reaction of the iodide or monosulfate reactant, above described, with sulfur trioxide, normally comprises a mixture of polysulfate compounds conforming to the above stated structural Formula I and is dependent upon the reactant proportions, reaction time, reaction temperature and other reaction variables. If desired, individual compounds may be separated therefrom by conventional physical separatory procedures, e.g. by fractional distillation; fractional crystallization using an inert solvent such as carbon tetrachloride or acetonitrile and paper chromatography. It is intended that the appended claims cover both individual polysulfate compounds and mixtures of polysulfate compounds.

The polysulfate products produced in accordance with the present invention are extremely valuable and versatile as chemical intermediates. As previously indicated, acrylate-type esters, polymers thereof and alcohols are among the class of materials which can be readily prepared therefrom. These esters, polymers and alcohols are known materials and are described more fully in U.S. Patents 2,642,416; 2,666,797; 3,171,861 and 3,102,103, for example.

The polysulfate products of the present invention may be directly converted to the corresponding fluoroalkyl or fluorocycloalkyl acrylate or methacrylate compounds having the formula $$R(CH_2)_mOCOC(Q)=CH_2$$

wherein R and $m$ have the afore-stated meanings and wherein Q is hydrogen or methyl, by contacting the polysulfate with acrylic or methacrylic acid, or the corresponding anhydrides, at an elevated temperature. Temperature is not critical. The broad operating temperature range is from about 25–200° C. Temperatures between about 50–150° C. are more suitable to maximize yield and minimize loss of product due to polymerization. Temperatures between about 80–120° C. are preferred with temperatures between about 90–110° C. being most suitable.

At least stoichiometric proportions of the acrylic reagent and the polysulfate should be employed but preferably an excess of the acrylic reagent is employed. Generally, the more sulfate groups in the molecule, the greater should be the excess of acrylic reagent employed. Usually, from 1–2 moles of acrylic reagent per mole of polysulfate starting material should be employed. Larger excesses of acrylic reagent may be employed, however, without adversely affecting the reaction.

Recovery of the acrylic product may be accomplished by simple and conventional procedures. Upon cooling the reaction mixture to room temperature, two phases are formed. The desired acrylic product is in the lower phase. The lower phase may be separated by mechanical means and distilled to recover purified product or the upper phase, which is water soluble, may be washed out with water, following which the water-insoluble lower phase may be dried and distilled.

The resulting acrylate or methacrylate monomers are known compounds, as indicated above, and as is further known, may be polymerized by conventional techniques to produce corresponding polyacrylates having utility as oil and stain repellant agents.

The polysulfate products of the present invention may also be converted to the corresponding fluoroalkyl or fluorocycloalkyl alcohols having the formula $$R(CH_2)_mOH$$

wherein R and $m$ have the afore-stated meanings by reaction with dilute mineral acid. The preferred polysulfate compounds for this reaction are those possessing 2–3 sulfate groups.

The hydrolysis reaction will proceed at temperatures between about 25–150° C. Generally, temperatures between about 90–110° C. are preferred for this reaction. The preferred mineral acid is $H_2SO_4$, although other mineral acids, such as $H_3PO_4$ and HCl can be used to advantage.

It has been found that with $H_2SO_4$, concentrations of about 25–75% produce good results with concentrations in the range of about 35–50% being preferred.

With respect to use of $H_2SO_4$, it has been found that weight ratios of about 1–2:1 $H_2SO_4$ to polysulfate reactant should be used to optimize results.

Recovery procedures or the alcohol products are analogous to those useful in recovering the acrylic products produced from the polysulfates as described above. Two phases are formed in the reaction mixture. The lower phase comprises the desired alcohol product and may be readily separated and distilled.

As indicated above, the alcohols formed from the polysulfate compounds of the invention are known compounds, useful as intermediates in the preparation of polyacrylate stain repellant agents, surfactants and other purposes.

The following examples are illustrative of the scope of the present invention but are not intended to be limiting thereof.

Example 1.—Preparation of bis(1,1,2,2-tetrahydroperfluorononyl) pyrosulfate

A glass lined pressure reaction vessel equipped with a pressure gauge and magnetic stirrer, connected to a Dry Ice-acetone cooled trap, was charged with 32 grams (0.061 mole of 1-iodo-1,1,2,2-tetrahydroperfluorononane $$(C_7F_{15}CH_2CH_2I)$$

and 18 grams (0.22 mole) of sulfur trioxide. The reaction vessel was cooled during the slow addition of the sulfur trioxide since the reaction was exothermic. The reaction vessel was flushed with nitrogen, sealed and heated to 70° C. for 16 hours during which the pressure increased to 20 p.s.i.g. and two liquid phases were formed. The liquid reaction mixture was cooled to room temperature and the gaseous constituents vented to a Dry Ice-acetone trap. The trap material (about 0.5 gram) was identified as sulfur dioxide. The upper liquid phase (about 30 grams) of the resulting two-phase system was transferred to a distillation flask. Unreacted and by-product materials including $SO_3$, $C_7F_{15}CH_2CH_2I$ and $I_2$ were pumped off at 150° C./2 mm., yielding 28 grams (95% conversion) of a tan liquid which solidified upon cooling.

Recrystallization of this solid from carbon tetrachloride yielded a crystalline solid (melting point—94–96° C.) having the structural formula $(C_7F_{15}CH_2CH_2OSO_2)_2O$.

*Analysis.*—Calculated for $C_{18}F_{30}H_8O_7S_2$ (percent): C, 22.23; F, 58.76; S, 6.60; H, 0.82. Found (percent): C, 21.6; F, 59.3; S, 6.65; H, 0.72.

Example 2.—Preparation of bis(1,1,2,2-tetrahydroperfluoropentyl pyrosulfate 43 grams (0.13 mole) of 1-iodo-1,1,2,2-tetrahydroperfluoropentane ($C_3F_7CH_2CH_2I$) were charged in a vessel of the type described in Example 1. 40 grams (0.50 mole) of sulfur trioxide were then slowly added thereto with ice-cooling. After the sulfur trioxide addition was completed the reaction vessel was sealed and heated to 95° C. for 16 hours during which the pressure increased to 70 p.s.i.g. and two liquid phases were formed. The reaction vessel was cooled and gaseous constituents vented to a Dry Ice-acetone trap. The upper layer (36 grams) of the resultant two-phase liquid system was transferred to a distillation flask and distilled. There was recovered a forecut of 8 grams of sulfur trioxide, and a main fraction of 15.5 grams of bis(1,1,2,2-tetrahydroperfluoropentyl) sulfate having the formula $(C_3F_7CH_2CH_2O)_2SO_2$ (boiling point—103–105° C./2 mm.). Analysis of the material comprising the main fraction was as follows: Calculated for $C_{10}F_{14}H_8SO_4$ (percent): C, 24.89; F, 54.29; H, 1.63; S, 6.53. Found (percent): C, 24.3; F, 53.4; H, 1.46; S, 6.71.

The undistilled material remaining in the distillation flask (13 grams) was identified as bis(1,1,2,2-tetrahydroperfluoropentyl) spyrosulfate of the structural formula $(C_3F_7CH_2CH_2OSO_2)_2O$, having a boiling point of 116° C./2 mm. Analysis of this material was as follows: Calculated for $C_{10}F_{14}H_8S_2O_7$ (percent): C, 21.05; F, 46.67; H, 1.40; S, 11.23. Found (percent): C, 22.3; F, 46.4; H, 1.6; S, 10.5.

Example 3.—Preparation of bis(1,1,2,2-tetrahydroperfluorononyl) trisulfate 50 grams (0.095 mole) of 1-iodo-1,1,2,2-tetrahydroperfluorononance ($C_7F_{15}CH_2CH_2I$) were charged in a vessel of the type described in Example 1. 48 grams (0.60 mole) of sulfur trioxide were then slowly added thereto with ice cooling. After the sulfur trioxide addition was completed the reaction vessel was sealed and heated to 95° C. for 16 hours during which the pressure increased to 70 p.s.i.g. and two liquid phases were formed. The reaction vessel was cooled and gaseous constituents vented to a Dry Ice-acetone trap. The upper layer (48 grams) of the resultant two-phase liquid system was transferred to a distillation flask. Unreacted and by-product materials including $SO_3$, $SO_2$ and $I_2$ were pumped off at 60° C./2 mm., for one-half hour, yielding 44 grams (0.042 mole) of a tan liquid which solidified on cooling. Recrystallization of this solid from carbon tetrachloride yielded a crystalline solid (melting point—102–104° C.) having the structural formula $[C_7F_{15}CH_2CH_2]_2(OSO_2)_3O$.

*Analysis.*—Calculated for $C_{18}F_{30}H_8O_{10}S_3$ (percent): C, 20.57; F, 54.28; H, 0.76; S, 9.14. Found (percent): C, 21.2; F, 55.4; H, 0.82; S, 8.90.

Example 4.—Preparation of bis(1,1,2,2-tetrahydroperfluorononyl) pyrosulfate

Into a reaction vessel of the type described in Example 1 there are placed 50 grams (0.056 mole) of bis(1,1,2,2-tetrahydroperfluorononane) sulfate and 6 grams (0.075 mole) of sulfur trioxide. The tube is sealed and the mixture is heated to 90° to 100° C. for 16 hours during which the pressure increases to 2 p.s.i.g. The reaction mixture is then cooled, transferred to a distillation flask and heated to 100° C./4 mm. for one hour. The undistilled material solidifies upon cooling to room temperature and is recrystallized from carbon tetrachloride. The resultant solid material (melting point—94–96° C.) is of the structural formula $(C_7F_{15}CH_2CH_2OSO_2)_2O$. Infrared and elemental analysis of the bis(1,1,2,2-tetrahydroperfluorononyl) pyrosulfate formed is similar to the material described in Example 1.

Example 5.—Preparation of 1,1,2,2-tetrahydropentadecafluorononyl acrylate

Into a reaction vessel equipped with a stirrer, reflux condenser and thermometer there were placed 32 grams (0.033 mole) of bis(1,1,2,2-tetrahydroperfluorononyl pyrosulfate and 6.5 grams (0.090 mole) of acrylic acid. Approximately 0.6 gram of hydroquinone was also added to the mixture to prevent polymerization of the acrylic acid. The reaction mixture was heated to 80° C. for a period of about 7 hours during which two liquid phases formed in the reaction vessel. The liquid contents of the reaction vessel were cooled to room temperature and the two liquid phases were separated. The lower water insoluble phase (32 grams) was distilled to yield 12 grams of 1,1,2,2-tetrahydropentadecafluorononyl acrylate having the structural formula $C_7F_{15}CH_2CH_2OCOCH=CH_2$ (boiling point—61–65° C./1 mm.) and 18 grams (0.018 mole) of pyrosulfate starting material.

Example 6.—Preparation of 1,1,2,2-tetrahydropentadecafluorononyl methacrylate

Into a reaction vessel of the type described in Example 5 there were placed 30 grams (0.031 mole) of bis(1,1,2,2-tetrahydroperfluorononyl) pyrosulfate and 12 grams (0.14 mole) of methacrylic acid. About 0.7 gram of hydroquinone was added to the mixture to prevent polymerization of the methacrylic acid. The reaction mixture was heated to 100–105° C. for 8 hours during which two liquid phases were formed in the reaction vessel. The liquid contents contained in the reaction vessel were cooled to room temperature, the liquid phases separated and the lower water insoluble phase distilled to yield 18 grams (0.037 mole) of 1,1,2,2-tetrahydropentadecafluorononyl methacrylate having the structural formula $C_7F_{15}CH_2CH_2OCOC(CH_3)=CH_2$ (boiling point—68–72° C./1 mm.) and 9 grams (0.009 mole) of pyrosulfate starting material. Elemental analysis of the methacrylate was as follows: Calculated for $C_{13}F_{15}H_9O_2$ (percent): C, 32.36; F, 59.13; H, 1.87. Found (percent): C, 31.5; F, 58.7; H, 1.75.

Example 7.—Preparation of 1,1,2,2-tetrahydropentadecafluorononyl alcohol

Into a reaction vessel of the type described in Example 1 there were charged 40 grams (0.076 mole) of 1-iodo-1,1,2,2-tetrahydroperfluorononane and 21.5 grams (0.268 mole) of sulfur trioxide. The reaction vessel was flushed with nitrogen, sealed and heated to 90° C. for 18 hours during which the pressure increased to 40 p.s.i.g. The reaction vessel contents were cooled to room temperature and the gaseous constituents, subsequently identified as sulfur dioxide, vented to a Dry Ice-acetone trap. The liquid contents of the reaction vessel were placed into a three-neck flask containing 200 ml. of 25% $H_2SO_4$ and sufficient $Na_2SO_3$ was added thereto to remove elemental iodine. The resultant mixture was heated to reflux temperature with stirring for about 1 hour. A water insoluble heavy oil layer, on which the aqueous layer comprised of dilute acid floated, was formed. After this heavy oil layer was separated from the aqueous phase, the aqueous phase was extracted with ether, and the ethereal extracts were dried and combined with the heavy oil layer. The ether was evaporated therefrom and the remaining oil was distilled. The product obtained consisted of 16.5 grams (0.0398 mole) of 1,1,2,2-tetrahydropentadecafluorononyl alcohol having the formula $C_7F_{15}CH_2CH_2OH$ (boiling point—82–84° C./10 mm.).

*Analysis.*—Calculated for $C_9H_5F_{15}O$ (percent): C, 26.09; F, 68.83; H, 1.21. Found (percent): C, 24.9; F, 69.1; H, 1.18.

Example 8.—Attempted hydrolysis of bis (1,1,2,2-tetrahydroheptafluoropentyl) sulfate with sulfuric acid Into a reaction vessel of the type described in Example 5 there was placed 15 grams (0.032 mole) of bis(1,1,2,2-tetrahydroheptafluoropentyl) sulfate having the formula $(C_3F_7CH_2CH_2O)_2SO_2$, boiling point 103–105° C./2 mm. and 100 ml. of 25% $H_2SO_4$. The mixture was heated to reflux temperature, 102° C., with stirring for 3 hours during which heavy oil and aqueous phases were formed. After the heavy oil layer was separated from the aqueous phase, the aqueous phase was extracted with ether, the ethereal extracts were combined with the heavy oil layer, dried and distilled. There were recovered 13 grams (0.026 mole) of starting sulfate, boiling point 103–105° C./ 2 mm. The sulfate was not hydrolyzed to the alcohol, $C_3F_7CH_2CH_2OH$.

Example 9.—Attempted esterification of bis(1,1,2,2-tetrahydroheptafluoropentyl) sulfate with acrylic acid Into a reaction vessel of the type described in Example 5 there were placed 13 grams (0.026 mole) of bis(1,1,2,2-tetrahydroheptafluoropentyl) sulfate having the formula $(C_3F_7CH_2CH_2O)_2SO_2$ and 5.6 grams (0.078 mole) of acrylic acid. About 0.5 gram of hydroquinone was added to the mixture to prevent polymerization of the acrylic acid. The reaction mixture was heated to 90–95° C. for 7 hours during which two phases were formed. The reaction vessel contents were cooled, washed with water and the heavy oil layer was separated from the aqueous phase, dried and distilled. There were recovered 11 grams (0.022 mole) of the starting sulfate, boiling point 103–105° C./ 2 mm. The sulfate was not esterified to the ester $$C_3F_7CH_2CH_2OCOCH=CH_2$$

Additional illustrative polysulfate compounds are listed in following Table I. These compounds are prepared by reaction of the fluoroalkyl and fluorocycloalkyl iodide or fluorodialkyl and fluorodicycloalkyl monosulfate reactants described above in a manner analogous to that described in the above examples. Corresponding alcohols and acrylic products may be obtained from these polysulfates by the methods described herein and illustrated in the above examples.

TABLE I

| Example: | Iodide or monosulfate reactant | Polysulfate product |
|---|---|---|
| 10 | $F(CF_2)_3CH_2I$ | $[F(CF_2)_3CH_2]_2(OSO_2)_2O$ |
| 11 | $[F(CF_2)_3CH_2O]_2SO_2$ | $[F(CF_2)_3CH_2]_2(OSO_2)_2O$ |
| 12 | $CF_3CH_2CH_2I$ | $[CF_3CH_2CH_2]_2(OSO_2)_3O$ |
| 13 | $[CF_3CH_2CH_2O]_2SO_2$ | $[CF_3CH_2CH_2]_2(OSO_2)_2O$ |
| 14 | $(CF_3)_2CF(CF_2)_2CH_2CH_2I$ | $[(CF_3)_2CF(CF_2)_2CH_2CH_2]_2(OSO_2)_2O$ |
| 15 | $[(CF_3)_2CF(CF_2)_2CH_2CH_2O]_2SO_2$ | $[(CF_3)_2CF(CF_2)_2CH_2CH_2]_2(OSO_2)_2O$ |
| 16 | $F(CFCl)_6CH_2CH_2I$ | $[F(CFCl)_6CH_2CH_2]_2(OSO_2)_2O$ |
| 17 | $[F(CFCl)_6CH_2CH_2O]_2SO_2$ | $[F(CFCl)_6CH_2CH_2]_2(OSO_2)_3O$ |
| 18 | $Cl(CF_2)_{11}CH_2CH_2CH_2I$ | $[Cl(CF_2)_{11}CH_2CH_2CH_2]_2(OSO_2)_3O$ |
| 19 | $[Cl(CF_2)_{11}CH_2CH_2CH_2O]_2SO_2$ | $[Cl(CF_2)_{11}CH_2CH_2CH_2]_2(OSO_2)_2O$ |
| 20 | $H(CF_2)_8CH_2I$ | $[H(CF_2)_8CH_2]_2(OSO_2)_2O$ |
| 21 | $[H(CF_2)_8CH_2O]_2SO_2$ | $[H(CF_2)_8CH_2]_2(OSO_2)_2O$ |
| 22 | $Br(CFCl)_{10}CH_2CH_2I$ | $[Br(CFCl)_{10}CH_2CH_2]_2(OSO_2)_3O$ |
| 23 | $[Br(CFCl)_{10}CH_2CH_2O]_2SO_2$ | $[Br(CFCl)_{10}CH_2CH_2]_2(OSO_2)_2O$ |
| 24 | $(CF_3)_2CF(CF_2)_9(CFCl)_2CH_2CH_2I$ | $[(CF_3)_2CF(CF_2)_2(CFCl)_2CH_2CH_2]_2(OSO_2)_2O$ |
| 25 | $[(CF_3)_2CF(CF_2)_2(CFCl)_2CH_2CH_2O]_2SO_2$ | $[(CF_3)_2CF(CF_2)_2(CFCl)_2CH_2CH_2]_2(OSO_2)_2O$ |
| 26 | $F(CF_2)_{12}CH_2CH_2CH_2I$ | $[F(CF_2)_{12}CH_2CH_2CH_2]_2(OSO_2)_4O$ |
| 27 | $[F(CF_2)_{12}CH_2CH_2CH_2O]_2SO_2$ | $[F(CF_2)_{12}CH_2CH_2CH_2]_2(OSO_2)_2O$ |
| 28 | $(CF_3)_2CF(CF_2)_8CH_2CH_2I$ | $(CF_3)_2CF(CF_2)_8CH_2CH_2]_2(OSO_2)_2O$ |
| 29 | $[(CF_3)_2CF(CF_2)_8CH_2CH_2O]_2SO_2$ | $[(CF_3)_2CF(CF_2)_8CH_2CH_2]_2(OSO_2)_2O$ |
| 30 | $H(CF_2)_{14}CH_2CH_2CH_2I$ | $[H(CF_2)_{14}CH_2CH_2CH_2]_2(OSO_2)_2O$ |
| 31 | $[H(CF_2)_{14}CH_2CH_2CH_2O]_2SO_2$ | $[H(CF_2)_{14}CH_2CH_2CH_2]_2(OSO_2)_3O$ |
| 32 | $Br(CF_2)CH_2I$ | $[Br(CF_2)CH_2]_2(OSO_2)_3O$ |
| 33 | $[Br(CF_2)CH_2O]_2SO_2$ | $[Br(CF_2)CH_2]_2(OSO_2)_2O$ |
| 34 | $CF_3[CF_2CF(CF_3)]_3CH_2CH_2I$ | $[CF_3[CF_2CF(CF_3)]_3CH_2CH_2]_2(OSO_2)_2O$ |
| 35 | $[CF_3[CF_2CF(CF_3)]_3CH_2CH_2O]_2SO_2$ | $[CF_3[CF_2CF(CF_3)]_3CH_2CH_2]_2(OSO_2)_3O$ |
| 36 | $H(CF_2)[CF_2CF(CF_3)]_5CH_2CH_2CH_2I$ | $[H(CF_2)[CF_2CF(CF_3)]_5CH_2CH_2CH_2]_2(OSO_2)_3O$ |
| 37 | $[H(CF_2)[CF_2CF(CF_3)]_5CH_2CH_2CH_2O]_2SO_2$ | $[H(CF_2)[CF_2CF(CF_3)]_5CH_2CH_2CH_2]_2(OSO_2)_2O$ |
| 38 | $Cl(CF_2)[CF_2CF(CF_3)]_2CH_2I$ | $[Cl(CF_2)[CF_2CF(CF_3)]_2CH_2]_2(OSO_2)_2O$ |
| 39 | $[Cl(CF_2)[CF_2CF(CF_3)]_2CH_2O]_2SO_2$ | $[Cl(CF_2)[CF_2CF(CF_3)]_2CH_2]_2(OSO_2)_2O$ |
| 40 | $Br(CF_2)[CF_2CF(CF_3)]_4CH_2CH_2I$ | $[Br(CF_2)[CF_2CF(CF_3)]_4CH_2CH_2]_2(OSO_2)_3O$ |
| 41 | $[Br(CF_2)[CF_2CF(CF_3)]_4CH_2CH_2O]_2SO_2$ | $[Br(CF_2)[CF_2CF(CF_3)]_4CH_2CH_2]_2(OSO_2)_2O$ |
| 42 | $(CF_3)_2CF[CF_2CF(CF_3)]_2CH_2CH_2I$ | $[(CF_3)_2CF[CF_2CF(CF_3)]_2CH_2CH_2]_2(OSO_2)_5O$ |
| 43 | $[(CF_3)_2CF[CF_2CF(CF_3)]_2CH_2CH_2O]_2SO_2$ | $[(CF_3)_2CF[CF_2CF(CF_3)]_2CH_2CH_2]_2(OSO_2)_2O$ |
| 44 | $(CF_3)_2CFCF_2CF(CF_3)CH_2CH_2CH_2I$ | $[(CF_3)_2CFCF_2CF(CF_3)CH_2CH_2CH_2]_2(OSO_2)_3O$ |
| 45 | $[(CF_3)_2CFCF_2CF(CF_3)CH_2CH_2CH_2O]_2SO_2$ | $[(CF_3)_2CFCF_2CF(CF_3)CH_2CH_2CH_2]_2(OSO_2)_2O$ |
| 46 | $(CF_3)_2CF[CF_2CF(CF_3)]_3CH_2I$ | $[(CF_3)_2CF[CF_2CF(CF_3)]_3CH_2]_2(OSO_2)_6O$ |
| 47 | $[(CF_3)_2CF[CF_2CF(CF_3)]_3CH_2O]_2SO_2$ | $[(CF_3)_2CF[CF_2CF(CF_3)]_3CH_2]_2(OSO_2)_3O$ |
| 48 | $[\overline{CF_2{-}(CF_2)_2{-}CF}CH_2CH_2I]$ | $[\overline{CF_2{-}(CF_2)_2{-}CF}CH_2CH_2]_2(OSO_2)_3O$ |
| 49 | $[\overline{CF_2{-}(CF_2)_2{-}CF}CH_2CH_2O]_2SO_2$ | $[\overline{CF_2{-}(CF_2)_2{-}CF}CH_2CH_2]_2(OSO_2)_2O$ |
| 50 | $\overline{CF_2{-}(CF_2)_3{-}CF}CH_2CH_2CH_2I$ | $[\overline{CF_2{-}(CF_2)_3{-}CF}CH_2CH_2CH_2]_2(OSO_2)_2O$ |
| 51 | $[\overline{CF_2{-}(CF_2)_3{-}CF}CH_2CH_2CH_2O]_2SO_2$ | $[\overline{CF_2{-}(CF_2)_2{-}CF}CH_2CH_2CH_2]_2(OSO_2)_2O$ |
| 52 | $\overline{CF_2{-}(CF_2)_4{-}CF}CH_2I$ | $[\overline{CF_2{-}(CF_2)_4{-}CF}CH_2]_2(OSO_2)_2O$ |
| 53 | $[\overline{CF_2{-}(CF_2)_4{-}CF}CH_2O]_2SO_2$ | $[\overline{CF_2{-}(CF_2)_3{-}CF}CH_2]_2(OSO_2)_2O$ |

Since various changes and modifications may be made in the invention without departing from the spirit thereof it is intended that all matter contained in the above description be interpreted as illustrative and not in a limiting sense.

We claim:
1. A polysulfate compound of the formula:

$$[R(CH_2)_m]_2(OSO_2)_pO$$

wherein R is
  (a) a haloalkyl group having from 1 to 20 carbon atoms in which the terminal carbon atom is substituted with members selected from the group consisting of fluorine, chlorine, bromine and hydrogen atoms and each carbon atom other than the terminal carbon atom, when present, is substituted with halogen atoms selected from the group consisting of fluorine and chlorine, or
  (b) a perhalocycloalkyl group having from 3 to 6 carbon atoms in which each halogen atom is a member selected from the group consisting of fluorine and chlorine, with the proviso that at least one fluorine atom is attached to each carbon atom in the haloalkyl or perhalocycloalkyl group; $m$ is an integer of from 1 to 3 and $p$ is an integer of from 2 to 6.

2. A polysulfate compound as defined in claim 1 wherein R is a haloalkyl group.

3. A polysulfate compound as defined in claim 1 wherein R is a perhalocycloalkyl group.

4. A polysulfate compound as defined in claim 1 wherein R is a perfluoroalkyl group.

5. A polysulfate compound as defined in claim 1 wherein R is a perfluoroalkyl group containing from 6 to 14 carbon atoms.

6. A polysulfate compound as defined in claim 4 wherein $p$ is 2.

7. A polysulfate compound as defined in claim 4 wherein $p$ is 3.

8. A polysulfate compound as defined in claim 4 wherein $m$ is 1.

9. A polysulfate compound as defined in claim 4 wherein $m$ is 2.

10. A polysulfate compound as defined in claim 4 wherein $m$ is 3.

References Cited
UNITED STATES PATENTS

| | | | |
|---|---|---|---|
| 3,052,708 | 9/1962 | Velluz et al. | 260—456 |
| 2,971,985 | 2/1961 | Joly et al. | 260—459X |

LEON ZITVER, Primary Examiner

L. DeCRESCENTE, Assistant Examiner

U.S. Cl. X.R.

260—458, 486, 617, 633